United States Patent [19]
White

[11] 3,891,488
[45] June 24, 1975

[54] STRUCTURAL BEARING ELEMENT HAVING A LOW FRICTION SURFACE AND METHOD

[76] Inventor: Charles S. White, 35815-42nd St. East, Palmdale, Calif. 93550

[22] Filed: Dec. 20, 1972

[21] Appl. No.: 316,844

Related U.S. Application Data

[63] Continuation-in-part of Ser. No. 76,110, Sept. 28, 1970, abandoned.

[52] U.S. Cl. ... 156/170; 29/149.5 B; 29/149.5 NM; 156/172; 161/47; 161/189; 308/238; 308/DIG. 8; 403/130
[51] Int. Cl. ............ B65h 81/00; B21d 53/10
[58] Field of Search ......... 156/169, 170, 172, 173, 156/175; 252/12.6; 29/149.5 B, 149.5 NM; 308/DIG. 7, DIG. 8, 173, 188, 189, 238; 403/130; 117/138.8 UF; 161/47, 189

[56] References Cited
UNITED STATES PATENTS

| | | | |
|---|---|---|---|
| 2,744,043 | 5/1956 | Ramberg | 156/155 |
| 2,898,228 | 8/1959 | Kelley | 117/138.8 UF |
| 2,963,612 | 12/1960 | Thorington | 313/116 |
| 3,011,219 | 12/1961 | Williams | 308/DIG. 7 |
| 3,030,248 | 4/1962 | Runton | 161/95 |
| 3,058,791 | 10/1962 | Stallman | 308/238 |
| 3,089,198 | 5/1963 | Eirhart, Jr. | 308/DIG. 7 |
| 3,163,475 | 12/1964 | Litsky | 308/37 |
| 3,240,644 | 3/1966 | Wolff | 156/172 |
| 3,290,197 | 12/1966 | Carmody | 156/175 |
| 3,458,223 | 7/1969 | White | 308/238 |
| 3,560,065 | 2/1971 | Shobert et al. | 308/238 |
| 3,598,410 | 8/1971 | Costopoulos | 156/172 |

FOREIGN PATENTS OR APPLICATIONS

| | | | |
|---|---|---|---|
| 1,927,181 | 12/1969 | Germany | 156/173 |

*Primary Examiner*—Daniel J. Fritsch
*Attorney, Agent, or Firm*—Burton & Parker

[57] ABSTRACT

A structural bearing element having a low friction surface is formed by winding on a bondable surface of the element a bondable low friction thread impregnated with a bonding resin, and the element and thread are then treated to cause the resin to bond the thread turns to each other and to the element. A representative application of the bearing is shown in an automotive type ball joint and an improved sealing means is shown on the joint.

16 Claims, 22 Drawing Figures

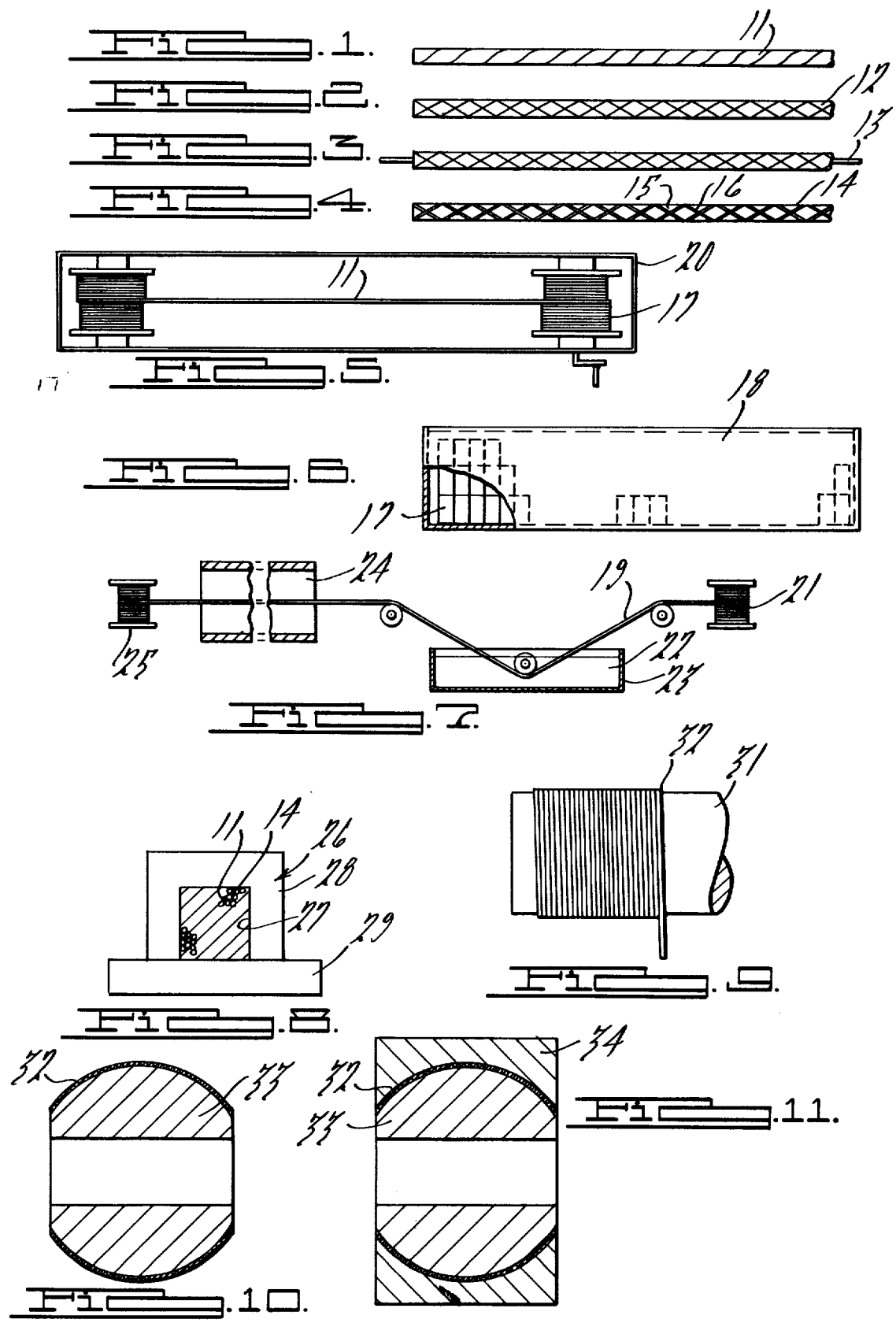

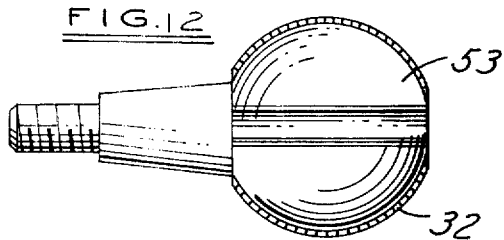
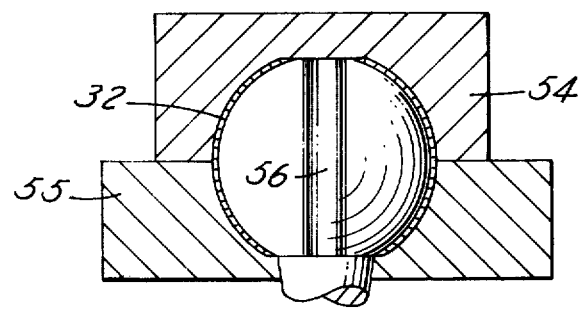
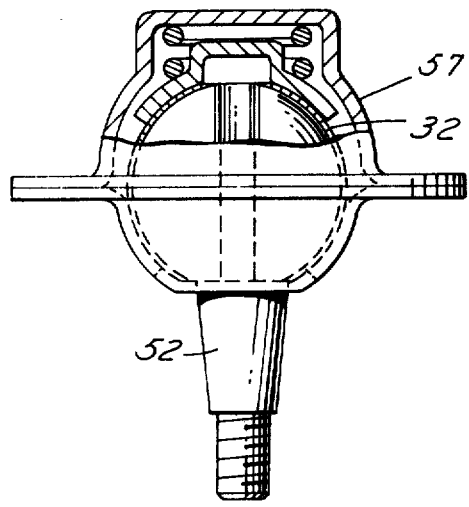
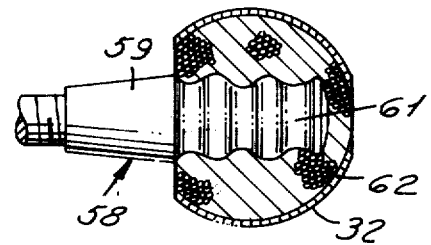

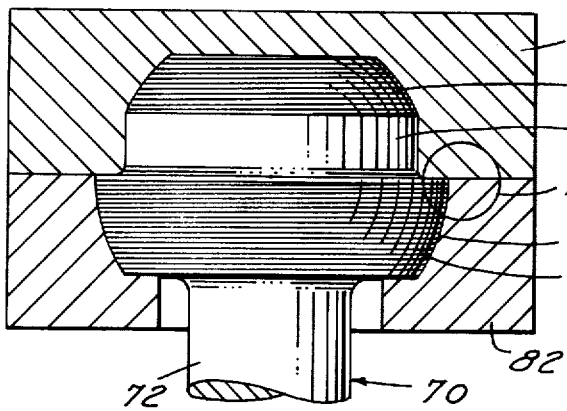
FIG.16
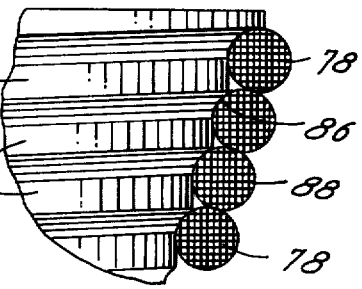
FIG.17
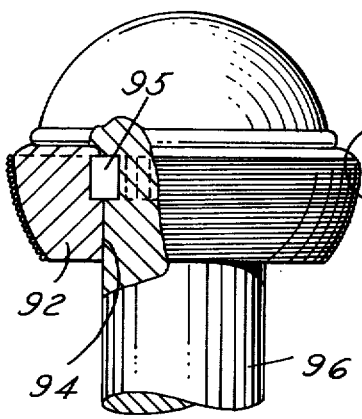
FIG.19
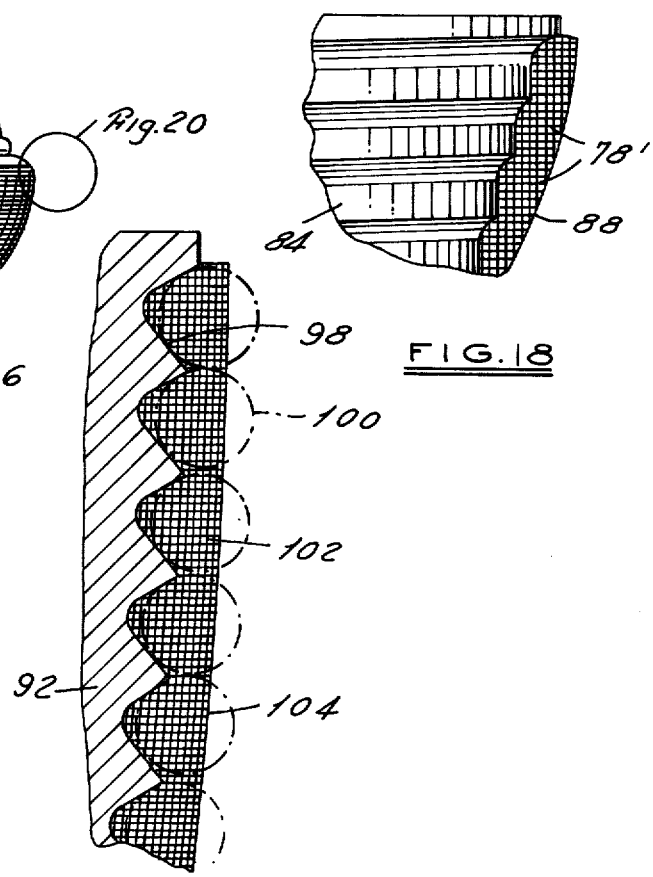
FIG.18
FIG.20

STRUCTURAL BEARING ELEMENT HAVING A LOW FRICTION SURFACE AND METHOD

FIELD OF INVENTION

This invention relates to low friction surfaces for structural bearing elements, to methods of producing such surfaces on structural bearing elements, and to structural bearing elements having such surfaces.

1. Prior Application

This application is a continuation-in-part of my earlier filed application, Ser. No. 76,110, filed Sept. 28, 1970, entitled WINDING METHOD OF PRODUCING A LOW FRICTION SURFACE, now abandoned.

BACKGROUND OF THE INVENTION

In my prior U.S. Pat. Nos. Re. 24,765, and 3,037,893 and 3,094,376, I disclosed the use of low friction Teflon (trademark of Du Pont for polytetrafluoroethylene) filaments woven with bondable filaments into a cloth which was then adhered to a structural bearing element to provide a low friction surface thereon. Bonding of Teflon is difficult and the use of a cloth containing Teflon filaments and bondable filaments overcame this difficulty. Drawbacks in the use of such cloth include the expense of cutting and shaping it to the surface of the structural bearing element, particularly spherically curved surfaces; difficulty in impregnating the cloth with the bonding resin; uncertainty as to the complete cure of the resin; difficulty of obtaining any mechanical interlock between the cloth fibers and the surface of the structural bearing element other than that provided by the resin itself. As a consequence there is a need for a new approach in applying low friction filaments to structural bearing members, which will yield a better bearing and which will lend itself to high production bearing manufacture.

SUMMARY OF THE INVENTION

The primary object of this invention is a method of producing a low friction surface utilizing low friction filaments on a structural bearing element which provides a better bearing and readily lends itself to high production and thereby not only overcomes a principal drawback of the prior art but results in longer bearing life.

In carrying out the invention I dispense with the use of a cloth and instead wind onto a bondable surface of the structural bearing element, a bondable thread of low friction filaments. The thread has been impregnated with a bonding resin which has been cured to the B-stage. Following winding the thread is cut off, and the thus wound element is treated with heat and pressure to bond the thread turns to each other and to the bondable surface of the element, thereby producing a low friction bearing surface one the element. Details of the thread impregnation are disclosed in my prior U.S. patent application Ser. No. 76,110, above mentioned, as well as hereinafter.

The bondable thread may comprise a composite of Teflon fibers and bondable fibers, or Teflon fibers alone which have been coated with a material rendering them bondable, such as a vacuum deposited thin layer of metal. If desired the filaments may be twisted or braided around a wire core.

The thread is impregnated with a bonding resin prior to winding it on the structural bearing element and the thus coated thread is sized and shaped and the resin is partially cured, as for example to the B-stage. The thus prepared thread may be wound into cones for subsequent handling and use.

The bondable surface of the structural bearing element upon which the impregnated thread is to be wound is a surface to which the resin will tenaciously adhere. In this regard the surface may be roughened or otherwise treated to provide a good bond at the interface of the resin. In some instances, as where the prior steps in forming the structural element leave a suitable bondable surface on the element, no further treatment, except possibly cleaning thereof, will be required. One highly satisfactory method of preparing the surface and also providing a mechanical interlock of the thread therewith, is to form a spiral groove on the surface into which the thread is wound with the thread exposed above the grooved surface. The groove turns may be sufficiently close together so that either before or at least upon treating the thread to bond it to the surface, the thread exposed above the groove will substantially abut adjacent turns thereby bridging the space between the grooves to provide a continuous bearing surface covering the wound area of the structural element.

The thread is wound from the cone onto the bondable surface of the structural bearing element and then cut off from the cone. The winding operation may be carried out in automatic production winding machinery designed for such purpose. Following winding, the thus wound element is treated with heat and pressure to shape the wound surface to the exactly desired configuration and dimension and the resin is concomitantly cured to its final stage to bond the thread to the element.

I have found that when utilizing this wound bearing approach as opposed to the prior art cloth approach, it is easier to insure satisfactory resin impregnation of the thread, easier to insure full cure of the resin in bonding the thread to the ball surface, easier to apply the Teflon filaments in a smooth layer to the surface of the structural bearing element, particularly spherically curved surfaces, and by grooving the surface a mechanical interlock of the filaments with the surface can be attained. The result is a better bearing, one which under the same operating conditions as a prior art cloth bearing, has a longer useful life, a bearing which will stand more severe punishment without failure.

In one embodiment the invention is shown in conjunction with the manufacture of an automotive type ball joint assembly wherein the thread is wound on a spherically curved surface of a ball portion of the joint, in one instance an integral part of the ball stud itself and in another instance a separately manufactured sector which is mounted on the stud. Because a ball joint assembly incorporating my improved bearing may be operated essentially dry, as opposed to being grease-filled, special sealing means are shown to prevent entry of dirt or foreign matter into the joint through the ball stud opening of the socket.

I also disclose herein a method of making a bearing element wherein the structural portion is formed by winding layers of resin coated bondable filament to build up a structural body and the bearing surface portion comprises a wound layer of resin coated low friction filaments on a surface of such body. Upon application of heat and pressure the resin is cured bonding all the turns together in unit secured relation.

Other objects, advantages, and meritorious features will appear hereinafter.

BRIEF DESCRIPTION OF THE DRAWINGS:

FIG. 1 is a view of a thread made from lengths of low friction filaments which are twisted together;

FIG. 2 is a view of a thread made from lengths of low friction filaments which are braided together;

FIG. 3 is a view of the thread illustrated in FIGS. 1 and 2 having a wire through the center thereof;

FIG. 4 is a view of a thread of the compound type having lengths of low friction filaments twisted or braided with lengths of bondable filaments or fibers;

FIG. 5 is a schematic view of a vacuum housing for the vacuum deposit of metal on the thread;

FIG. 6 is a view of a tank in which spools of the thread are impregnated with a resin;

FIG. 7 is a view of a device for impregnating an individual thread when wound from one spool to another;

FIG. 8 is a view of a compacting, sizing and heating device for making a cord of predetermined shape and size from a multiplicity of threads;

FIG. 9 is a view of a shaft with the cord wound thereon prior to final curing of the resin with which the cord was treated;

FIG. 10 is a view of a turncated ball having the cord wound thereon and adhered thereto;

FIG. 11 is a view of the ball illustrated in FIG. 10 when encompassed by an outer housing;

FIG. 12 is a view of a ball stud having a cord wound thereon and secured thereto;

FIG. 13 is a view of the ball portion of the ball stud illustrated in FIG. 12 after being placed between a pair of dies when the cord thereon is compacted and adhered to the ball in the final cured stage;

FIG. 14 is a view of the ball illustrated in FIG. 13 mounted within a socket of conventional form;

FIG. 15 is a sectional view of a stud with a ball thereon shown in section formed from a wound cord of bondable material with the cord of low friction material wound on the bondable cord;

FIG. 16 shows a somewhat differently shaped ball portion of a ball stud from that of FIGS. 12 and 13, with the ball portion wound with the thread and received between a pair of dies for compacting and curing the thread on the stud;

FIG. 17 shows an enlarged fragmentary view of the low friction thread wound into a buttress thread type groove as at the encircled portion indicated at 17 in FIG. 16 (but with the dies omitted for clarity), prior to compacting the thread and final cure of the resin;

FIG. 18 is a view similar to FIG. 17 but showing the thread following compacting thereof and cure of the resin;

FIG. 19 shows a ball stud having a ball segment mounted thereon which segment has been provided with my improved wound type low friction surface;

FIG. 20 is an enlarged fragmentary cross-sectional view taken at the encircled area 20 of FIG. 19;

DESCRIPTION OF THE PREFERRED EMBODIMENTS

Figure 21:
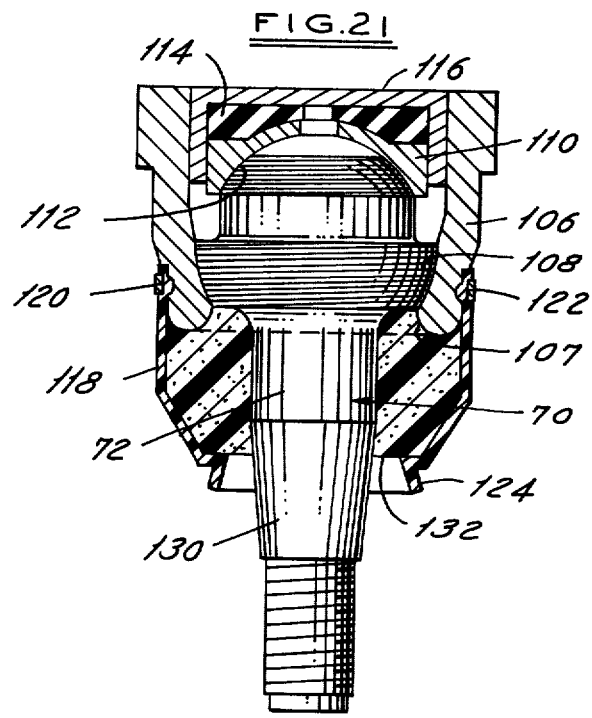
FIG. 21 is a cross-sectional view through a ball joint assembly embodying the improved thread wound stud and showing an improved sealing means.

This invention contemplates a bondable low friction thread, viz., a thread comprising low friction fibers such as Teflon and the like, which thread may be resin bonded to a surface of a structural bearing element. To render the thread bondable it may be formed of a composite of Teflon fibers intermingled with bondable fibers such as Dacron, cotton, or the like, or the Teflon fibers may be coated with a thin layer of metal that will make a good bond with the resin. For example, lengths of bundles of filaments of Teflon or like low friction material are formed into a twisted thread 11, as illustrated in FIG. 1, or as a braided thread 12, as illustrated in FIG. 2, or with a wire 13 provided in the center of either of the threads 11 and 12. In FIG. 4, a composite thread 14 is illustrated using lengths of bundles of Teflon fibers 15 twisted or braided with lengths of bundles of bondable filaments or fibers 16 such as Dacron, cotton, nylon and the like so that the thread can be adhered by the bondable filaments or fibers. The thread of FIGS. 1, 2 or 3 is treated in different manners to render it bondable, as for example in FIG. 5, the thread is schematically shown as being wound from spool 17' onto spool 17 in a vacuum plating tank 20 and therein vacuum coated with silver or like metal, or an oxide, fluoride or sulphide of a metal, the coating being extremely thin but sufficient to provide a good bond with a resin subsequently applied thereto. In FIGS. 6 and 7 the thread is schematically shown being coated with a bonding resin, for example in FIG. 6 spools 17 of the thread are placed in a tank 18 and immersed in a resin therein and in which vacuum may be applied to coat the threads on the spools with the resin, while in FIG. 7, thread 19 on a spool 21 passes through a resin 22 within a tank 23 and through a heating device 24 where the resin is cured to the B-stage and wound upon a spool 25. In FIG. 8, a sizing and curing device 26 has an opening 27 of any desired shape, herein illustrated as being square, through which a large number of the threads 11, 14 and the like are drawn with low heat applied thereto by the upper portion 28 and a higher heat applied thereto at the bottom by the lower portion 29. The curing is maintained within the B-curing range and the cord 32 thus formed may be approximately a one-thirty-second of an inch square.

It is to be understood that the foregoing disclosure for coating the thread, sizing the thread, and curing it is intended to be merely suggestive of the process for resin coating the thread. The important criteria is that the thread be thoroughly and uniformly coated, sized and shaped and cured, in the case of a thermosetting resin, to the B-stage, before it is wound on the structural bearing element and the molding and bonding steps performed.

FIG. 9 illustrates a shaft 31 having the resin coated bondable thread 32 wound on a bondable exterior surface thereof. As used in this disclosure, a bondable surface is intended to characterize a surface of a structural bearing element to which the resin on the thread will tenaciously adhere. Following winding of the thread it is compacted about the shaft as by means of suitable heated dies and the resin is cured to the C-stage to bond the thread turns to each other and to the shaft providing a low friction bearing surface thereon.

In FIG. 10, a ball 33 of a rod end is shown having the resin coated cord or thread 32 wound onto a bondable surface thereof after which a housing 34 (see FIG. 11) is applied to the ball in the usual manner, as by spinning, forcing the unit through a die or the like. The thread 32 is compacted on the ball and cured to the final stage with the thread turns bonded to the ball and to each other, thereby providing a low friction surface on the ball.

In FIG. 12, a ball stud has the ball portion 53 thereof wound with the bondable low friction thread 32 in the manner pointed out hereinabove after which the threads are compacted and cured within heated elements or dies 54 and 55 shown in FIG. 13. The ball may have one or more oil grooves 56 extending thereinto into which the thread turns are compacted and cured within the elements 54 and 55. The ball stud is substituted for a ball stud now employed and is supported within a standard type of socket 57, as illustrated in FIG. 14. The low friction surface provided by the compacted thread 32 will function in the normal manner and in view of the oil groove 56, a lubricant may be provided from time to time to prevent the ingress of dust and grime to within the engaged surfaces as well as providing a lubricant directly on the metal surface of the socket.

In FIG. 15, a ball stud 58 is illustrated having a stud portion 59 provided with corrugations 61 on the head end. A bondable thread or cord 62 which has been treated with resin is wound upon the corrugations 61 until a ball head is formed and on which the low friction resin impregnated bondable thread 32 is wound to provide an outer low friction surface. The two threads or cords may be wound in different operations. The wound bondable thread or cord 62 can be formed into the ball and finally cured after which the cords 32 are wound thereon compacted and cured to provide a perfect sphere and an accurate diameter.

The winding of the thread will be accomplished on automatic winding machines well known in the art to produce the rapid application of the thread. The low friction cord can be wound upon the bondable cord or backed by wound bondable cord as mentioned hereinabove. The cord is compacted and adhered to the ball, backing cord or other elements which are thereafter cured to the final or C-stage. This process substantially reduces the cost of applying the layer of low friction filaments to balls or other elements directly or with a bondable cord wound on the element or employed for backing the low friction wound cord. The ball may have a sticky coating applied thereto prior to the winding operation or such coating may be sprayed thereon as the cord is being wound so that it will adhere to the ball and the turns adhered to each other until the assembly has the cords compressed, cured and adhered to the ball surface. This forms a smooth hard surface having low friction characteristics of an exact diameter and true spherical form.

The building of the thread from lengths of bundles of filaments of low friction material by twisting, braiding and the like or formed as a compound thread by using lengths of bondable filaments or fibers therewith and in some cases with a wire core to help maintain the cord in position after being bound, provides a basic concept. The threads themselves may be employed separately, especially those having the wire core, while of smaller cross section will provide the complete coverage of the surface to which the low friction material is to be applied. The application of a very light coating of metal such as silver on the low friction Teflon filament will permit the resin to adhere thereto and bond the threads to each other and to an element on which it is wound upon the application of heat and pressure. With the threads and cords formed in the manner herein illustrated, low friction surfaces can be provided through the rapid winding thereof on mandrels, balls, sleeves, cords and the like to produce any type of low friction surface on a backing or element, a few of which have been illustrated and described hereinabove.

In FIG. 16, I have shown a ball stud 70 having a shank portion 72 and a head portion 74. The head portion is provided with a pair of axially spaced truncated spherically curved bondable portions, each of which has been wound with the resin impregnated bondable low friction thread as indicated at 76 and 78. Prior to the winding, the resin impregnated thread has been sized and the resin cured to the B-stage. Following winding the stud 70 is placed in the heated dies 80 and 82 which serve to compact the thread firmly against the bondable surface of the ball portion to size the wound areas and effect the final cure of the resin to the C-stage and ensure a good bond of the thread turns to each other and to the surface of the stud.

The surface of the ball portion 74 upon which the thread is wound may be provided with a spiral groove to improve the bonding of the thread to such surface. A representation of such groove is shown in FIGS. 17 and 18 at 84. The groove may take the form of a buttress thread having a shoulder 86 facing in the direction of axial loading of the ball, which is to say in the direction of decreasing diameters of the spherically curved surface, and the bottom 88 of the groove is a right-cylinder surface coaxial with the ball stud. Such groove facilitates the winding of the thread as the thread will not be subject to the tendency to slide down the curve of the spherically curved surface during winding, and the increased area of the stud surface as well as the configuration of such surface resists displacement of the thread under axial loading and improves the bondable character of the stud surface so that the resin will more tenaciously adhere thereto to lock the thread turns in place on the ball portion. FIG. 17 shows the thread 78 following winding and before compacting and final cure by the dies 80 and 82. FIG. 18 shows the thread at 78' following compacting and final cure of the resin, and it will be noted that the thread turns have been flattened to provide a smooth uninterrupted outer bearing surface 88 exactly conforming to the surface 90 of the die 82, and that each thread turn 78 is pressed into abutting and bonded contact with its adjacent turns and completely fills the groove.

In the embodiment of FIGS. 16–18 satisfactory results may be attained utilizing a composite thread of 50 percent Teflon and 50 percent Dacron filaments impregnated with a bonding resin such as phenol formaldehyde resin. The impregnated thread is sized and cured to the B-stage. Nominal diameter of the B-stage thread may be anywhere from 0.013 inch or less to 0.0625 inch as desired. During compressing and curing in the dies the thread may be reduced by from one-half to one-third of its B-stage diameter. However, I have found it is important that whatever diameter B-stage thread is selected, such diameter should be held quite accurately and that the thread should be thoroughly impregnated with the resin, thereby insuring repeatably good results during bearing manufacture.

In FIG. 19 a ball stud sector 92 has been wound with the B-stage thread and then the wound sector placed between heated dies to compact the thread against the spherically curved surface of the sector and the resin then cured to bond the thread turns to the sector and to each other. The sector is thereafter mounted on a stud to provide the finished part shown in FIG. 19. Means 95 are provided to lock the sector on the stud against relative rotation. Such means may be of any suitable form such as a circumferential series of interfitting lands and grooves, the lands being on the exterior of the stud shank 96 and the grooves in the bore 94 of the sector.

In FIG. 20 the exterior of the sector 92 is shown as having a spiral V-shaped groove 98 and the B-stage thread is shown in phantom outline at 100 as it would appear following winding into the groove and before compacting and cure. In the compacted and cured condition the resin impregnated thread forms an uninterrupted homogeneous bonding resin and filament bearing layer 102 which completely fills the groove and provides a spherically curved bearing surface 104 for the sector which exactly matches the surface of the die in which the compacting and curing of the bearing was effected.

As will be appreciated by those skilled in the art, forming a low friction bearing surface on a ball stud as shown in FIGS. 12–20 overcomes serious difficulties inherent in prior art ball stud manufacture wherein a smooth bearing surface must be provided on the ball stud or the sector itself and as a result of heat treatment to provide the bearing surfaces, stud failure in use is a definite possibility requiring, in some instances 100 percent inspection, and even that does not assure there will be no failure. The stud need not, according to my teachings, be especially hardened, in fact no hardening is required. The spherically curved surfaces need not be perfectly smooth, though of course they should be uniformly curved. They should be clean and free of oil, dirt and the like to insure a good bond between them and the resin impregnated thread.

The sector 94 in the prior art is generally a sintered metal bearing part. According to my foregoing teaching such may now be a conventional steel part made in any suitable fashion as the bearing surface is that provided by the molded bondable Teflon thread windings.

Figure 22:
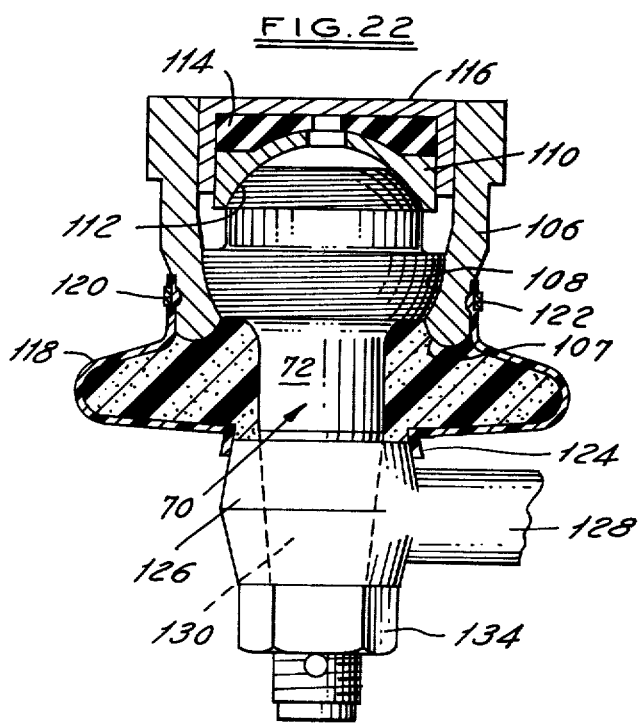
FIG. 22 shows the ball joint assembly of FIG. 21 mounted on, for example, the structural part of an automotive suspension system.

In FIGS. 21 and 22 I have shown a ball joint assembly incorporating my improved wound stud and also a dust and moisture seal. The joint includes a housing 106 of conventional design having a ball stud receiving socket opening outwardly at 107 through one end of the housing with a spherically curved bearing surface 108 in the socket against which the wound surface 78 of the stud of FIG. 16 is seated. A follower element 110 has a spherically curved surface 112 held against the spherically curved wound surface 76 by a resilient pad 114 disposed in compression between the follower and a cover member 116 which is secured to the housing in any suitable manner. Because of the lubricity of the Teflon windings 76 and 78 the joint requires little or not lubrication.

While if desired the ball joint may be grease filled to exclude contamination, I have shown an improved seal eliminating and improving on this expedient. The seal comprises a flexible boot 118 which encircles the housing adjacent the opening. A clamping band 120 tightly encircles the upper margin of the boot pressing it into a peripheral groove 122 to lock the boot on the housing. The boot may be formed of a urethane or neoprene rubber moled to the shape shown to extend down along the shank of the ball stud and may have a peripheral flange or lip 124 shaped to mate with a boss 126 or other surface of an arm 128 to which the stud 70 is secured by a nut 134 threaded onto the stud. Such portion of the seal is conventional.

To complete construction of the seal, the cylindrical portion 72 and tapered portion 130 of the shank are lightly coated with a release agent and then with the ball joint inverted 180° from the position shown in FIG. 21, the boot is injected with a foamable or blowable material, such as a foamable polyurethane, which foams to the level 132 about the shank and fills the boot. The resin selected should blow to form a closed-cell type flexible sponge-like filler which adheres to the inside of the boot and to the opening 107 and edge of the housing thereadjacent. Because of the release agent on the ball stud the sponge filler does not adhere to it but encircles it in intimate contact. Upon application of the ball joint to the support arm 128 as shown in FIG. 22, the boot and sponge will collapse toward the housing, the sponge sliding up the shank of the stud to assume the position shown, and a dust, dirt and water-tight seal is effected between the stud shank and the housing.

While I have shown and described the ball stud as having the B-stage thread compacted and the resin cured and bonded while the stud is between a pair of heated dies as in FIGS. 13 and 16, it is to be understood that the compacting, curing and bonding may be performed after the wound ball stud has been inserted in the ball joint housing, as for example the housing 106 shown in FIGS. 21 and 22. If the bearing surfaces 108 and 112 are either coated with a release agent or are highly polished so that the B-stage resin in the thread will not bond to them, then following assembly of the wound stud in the ball joint assembly, the assembly may be subjected to a resin curing temperature to cure the resin impreganted thread to the C-stage and cause it to bond the thread to the stud. The compression pad 114 will exert sufficient axial thrust against the follower 110 so that satisfactory compression on the thread windings is effected. By bonding and curing the thread in situ in the ball joint housing, rather than between heated dies, steps in the manufacture may be eliminated and costs accordingly reduced.

An advantage afforded by the use of the low friction thread over the use of woven low friction cloth shown in the prior art is that thorough impregnation of the thread by the bonding resin may be repeatably achieved with greater reliability, thereby improving reliability of the final structure. In addition, the amount of resin on the thread can be more easily and accurately controlled than with the cloth, and as a consequence the dimension, density, and reliability of the low friction surface formed by the winding method herein disclosed is superior. Also, the cloth did not lend itself to being interlocked with the surface of the underlying structural element as does the thread when wound into the spiral grooves, as shown in FIGS. 17, 18 and 20, and as a consequence a stronger bond may be effected.

While I have mentioned the use of a phenol formaldehyde resin, a reaction product of a phenol resin and formaldehyde, other resins may also be utilized depending upon the particular application. In this regard, those skilled in the art may select epoxy resins, urethane resin and the like. At this juncture of my development it would appear that the resin selected should be capable of application to the thread in a form that will insure thorough impregnation, and following impregnation can be cured or set to an essentially non-tacky condition so that it may be temporarily wound up in cones or spools for subsequent use during winding on the structural bearing element. Thread thus treated may be wound on either cylindrical or spherically curved surfaces, or surfaces of other shapes, without further treatment. If desired, however, it is within the scope of this invention to soften the resin at the time of winding so that as the thread is wound on the bearing element it will immediately tend to adhere thereto. It is also within the purview of the invention to coat the surface of the structural bearing element with a compatible adhesive to stabilize the turns as they are wound thereon. These expedients will be dictated by the character of the bonding resin employed, the nature and shape of the structural element being wound, the equipment for winding and other factors that will be considered by the routineer in implementing the concepts hereinabove disclosed.

While the type of resins hereinabove contemplated, that are cured to the B-stage on the thread, and following winding of the thread onto the structural bearing element are cured to the C-stage, are thermosetting resins, it is within the purview of my invention to use a thermoplastic resin whose softening temperature is above the expected operating temperature of the bearing. In the case of this class of resins, if impregnation of the thread is carried out with the thermoplastic in a solvent solution, the solvent should be removed before the thread is wound into spools for subsequent use. Following winding of the thread onto the structural part, the winding is subjected to heat and pressure to cause coalescence of the resin into a continuous matrix, and then with cooling of the resin solidification bonding the thread turns to each other and to the structural bearing element.

In the following claims the resin, whether a thermoset or a thermoplastic, may be characterized as being in a solidified yet thermoplastic state on the thread following impregnation. This is intended to characterize a thermosetting resin which has been cured to the B-stage, as well as a true thermoplastic resin which may be softened by heating. In each instance the resin will soften and coalesce to form a continuous matrix about and through the bondable low friction thread wound on the structural element. In the case of a thermosetting resin, the heat and pressure required to mold and C-stage the thread on the structural bearing element will cause the resin on the thread turns to first soften and coalesce into a continuous matrix and as the polymerization proceeds the resin assumes its normal solifified cross-linked character. In the case of a thermoplastic resin, the heat and pressure to mold the thread turns to the structural bearing element will simply effect a softening and coalescence of the resin to a continuous matrix which upon cooling will solidify and effect bonding of the thread turns to each other and to the structural bearing element.

What is claimed is:

1. The method of producing a low friction bearing surface on a structural bearing element, characterized by the steps of helically winding a multiplicity of juxtaposed turns of a continuous strand of bondable low friction thread impregnated with a bonding resin in a solidified yet thermoplastic state onto a surface of the element, said thread element being comprised of bondable filaments and low friction filaments, and treating such wound element to coalesce the resin into a continuous solidified matrix bonding the turns of the thread to the element and to each other.

2. The invention defined by claim 1 characterized in that the resin is a thermosetting resin, and curing the resin to the B-stage before winding the impregnated thread on the surface of the element, and said treating includes curing the resin to the C-stage.

3. The method as recited in claim 1, characterized in that said treating embodies pressure and heat to compact the thread on the element and cure the resin coating thereon.

4. The method as recited in claim 1, characterized in that said thread is made from continuous lengths of bundles of low friction filaments plated with a thin layer of bondable metal and the filaments are twisted together.

5. The method as recited in claim 1, characterized in that said thread is made from continuous lengths of intertwined bundles of bondable filaments and low friction nonbondable filaments.

6. The method as recited in claim 1, characterized in that the thread is made from continuous lengths of bundles of low friction filaments which are interrelated about a wire which is located substantially on the center of the thread.

7. The method as recited in claim 1, characterized in that the thread is made of continuous lengths of bundles of polytetrafluoroethylene fibers and lengths of bundles of fibers of bondable material.

8. The method as recited in claim 1, characterized in that the thread is coated with a thermosetting bonding resin and the coated thread is compacted to a predetermined size and shape and heated to cure the resin to the B-stage before winding on the surface of the element, and said treating involves curing of the resin to the C-stage.

9. The method as recited in cliam 2, characterized in that the element is a ball stud with the turns of the bondable low friction thread wound on a ball portion thereof, and the ball stud is assembled in a ball joint housing with the wound surface pressed into abutting contact with a nonbondable bearing surface thereof, and the ball stud is treated with heat to cure the resin to bond the thread to the wound surface thereof.

10. The method as recited in claim 2, characterized in that the element is a truncated ball with the turns of the low friction thread wound on and bonded to the spherical portion thereof, and applying a metal sleeve over said thread with an inner truncated spherical surface thereof in engagement therewith.

11. The method as recited in claim 4, characterized in that a resin is applied to the metal surface of the thread to bond thereon.

12. The method as recited in claim 7, characterized in that the thread is coated with a bonding resin which is cured to the B-stage before being wound, and wherein said treating embodies pressure and heat to compact the thread on the element and cure the resin coating thereon to the C-stage.

13. The method of producing a low friction bearing surface on a structural bearing element, characterized by the steps of impregnating a length of bondable thread with a bonding resin in a liquid state, said thread being comprised of bondable filaments and low friction filaments, treating the resin to convert it to a solid yet thermoplastic condition, winding the length of impregnated thread in a series of juxtaposed turns upon a surface of the element to cover the same, and treating such wound element to shape the exposed surface of the winding to a predetermined configuration and cause the resin to coalesce into a continuous solidified matrix bonding the turns of the thread to each other and to the element.

14. A bearing element having a low friction surface produced by forming a spiral groove of closely adjacent turns upon the surface of the element, winding into said groove a continuous strand of bondable low friction thread impregnated with a bonding resin, said thread being comprised of bondable filaments and low friction filaments, and treating the wound element to cause said bonding resin to bond the thread turns to each other and to the groove.

15. The invention defined by claim 14 characterized in that the bearing element has a spherically curved convex surface and said groove is in such surface.

16. A bearing element having a low friction surface produced by winding upon a surface of the element a bondable thread impregnated with a bonding resin cured to the B-stage, said thread being comprised of bondable filaments and low friction filaments, and treating said element and the turns wound thereon with heat and pressure to cure the resin to the C stage and bond the turns of the thread to each other and to said surface.

* * * * *